(12) United States Patent
Das et al.

(10) Patent No.: US 10,235,484 B2
(45) Date of Patent: Mar. 19, 2019

(54) AUTOMATIC TIMING-SENSITIVE CIRCUIT EXTRACTION

(71) Applicant: Oracle International Corporation, Redwood City, CA (US)

(72) Inventors: Prasanjeet Das, Milpitas, CA (US); Zixu Zhu, Milpitas, CA (US); Anjui Shey, Fremont, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 238 days.

(21) Appl. No.: 15/425,642

(22) Filed: Feb. 6, 2017

(65) Prior Publication Data

US 2018/0225399 A1     Aug. 9, 2018

(51) Int. Cl.
*G06F 17/50*     (2006.01)

(52) U.S. Cl.
CPC ........ *G06F 17/5031* (2013.01); *G06F 17/505* (2013.01)

(58) Field of Classification Search
CPC .............. G06F 11/3466; G06F 17/505; G06F 17/5022; G06F 17/5031; G06F 17/5036; G06F 17/5045; G06F 18/5081
USPC ........................................ 716/105, 108, 113
See application file for complete search history.

(56) References Cited

U.S. PATENT DOCUMENTS

| | | | | |
|---|---|---|---|---|
| 2007/0033561 A1* | 2/2007 | Jones | .................. | G06F 17/5031 716/107 |
| 2008/0059922 A1* | 3/2008 | Korobkov | ........... | G06F 17/5036 716/102 |
| 2010/0218148 A1* | 8/2010 | Baumgartner | ........ | G06F 17/504 716/102 |
| 2012/0131530 A1* | 5/2012 | Moffitt | ................ | G06F 17/5027 716/113 |
| 2016/0364519 A1* | 12/2016 | Allen | .................. | G06F 17/5081 |

* cited by examiner

*Primary Examiner* — Paul Dinh
(74) *Attorney, Agent, or Firm* — Marsh Fischmann & Breyfogle LLP; Kent A. Lembke; Daniel J. Sherwinter

(57) ABSTRACT

Embodiments include systems and methods for automatic timing-sensitive circuit extraction for statistical timing margin analysis of custom designs. A timing-sensitive circuit extractor system can take pre- or post-layout netlists for integrated circuits and can automatically generate a timing-sensitive netlist. For example embodiments can generate a connectivity graph from the netlist and can traverse the graph with constraints defined according to measurement nodes to extract the timing-sensitive circuit. Memory timing checks and corresponding stimuli can generally be pre-defined, and a test-bench generator can generate appropriate parameters, stimuli, etc. Statistical simulations can then be performed to quickly generate results, which can be post-processed to obtain timing margin distributions and to flag out design errors.

20 Claims, 13 Drawing Sheets

AUTOMATIC TIMING-SENSITIVE CIRCUIT EXTRACTION

FIELD

Embodiments relate generally to receiver circuits, and, more particularly, to techniques for automatic timing-sensitive circuit extraction and statistical timing margin simulation in custom circuit designs and/or other complex circuits.

BACKGROUND

Many integrated circuits, such as various custom circuit designs, typically involve several timing margin checks to ensure functionality. Some conventional industry approaches use deterministic analysis of such designs at multiple process corners and seek to ensure functionality under on-chip variation by enforcing severe guard-bands. Such approaches generally assume all devices and design parameters to be simultaneously at their respective worst case conditions, thereby representing the circuit in a highly, likely overly, pessimistic manner. While statistical analysis can yield more accurate representations, such analyses generally involve impractical runtimes for large full-block designs. For example, performing statistical analysis across a large number of circuit blocks over an entire spectrum of operating frequencies and other conditions could take weeks or months.

BRIEF SUMMARY

Among other things, embodiments provide novel systems and methods for automatic timing-sensitive circuit extraction for statistical timing margin simulations. A timing-sensitive circuit extractor system can take pre- or post-layout netlists for integrated circuits and can automatically generate a timing-sensitive circuit netlist. For example embodiments can generate a connectivity graph from the netlist and can traverse the graph with constraints defined according to measurement nodes to extract the timing-sensitive circuit. Timing checks and corresponding stimuli can generally be pre-defined, and a test-bench generator can generate appropriate parameters, stimuli, etc. (e.g., a statistical spice deck with global and local variation parameters, appropriate input stimuli and measure statements, etc.). Statistical simulations (e.g., that can be parallelized across multiple processors) can then be performed to quickly generate results, which can be post-processed to obtain timing margin distributions and to flag out design errors.

BRIEF DESCRIPTION OF THE DRAWINGS

The present disclosure is described in conjunction with the appended figures.

Figure 1:
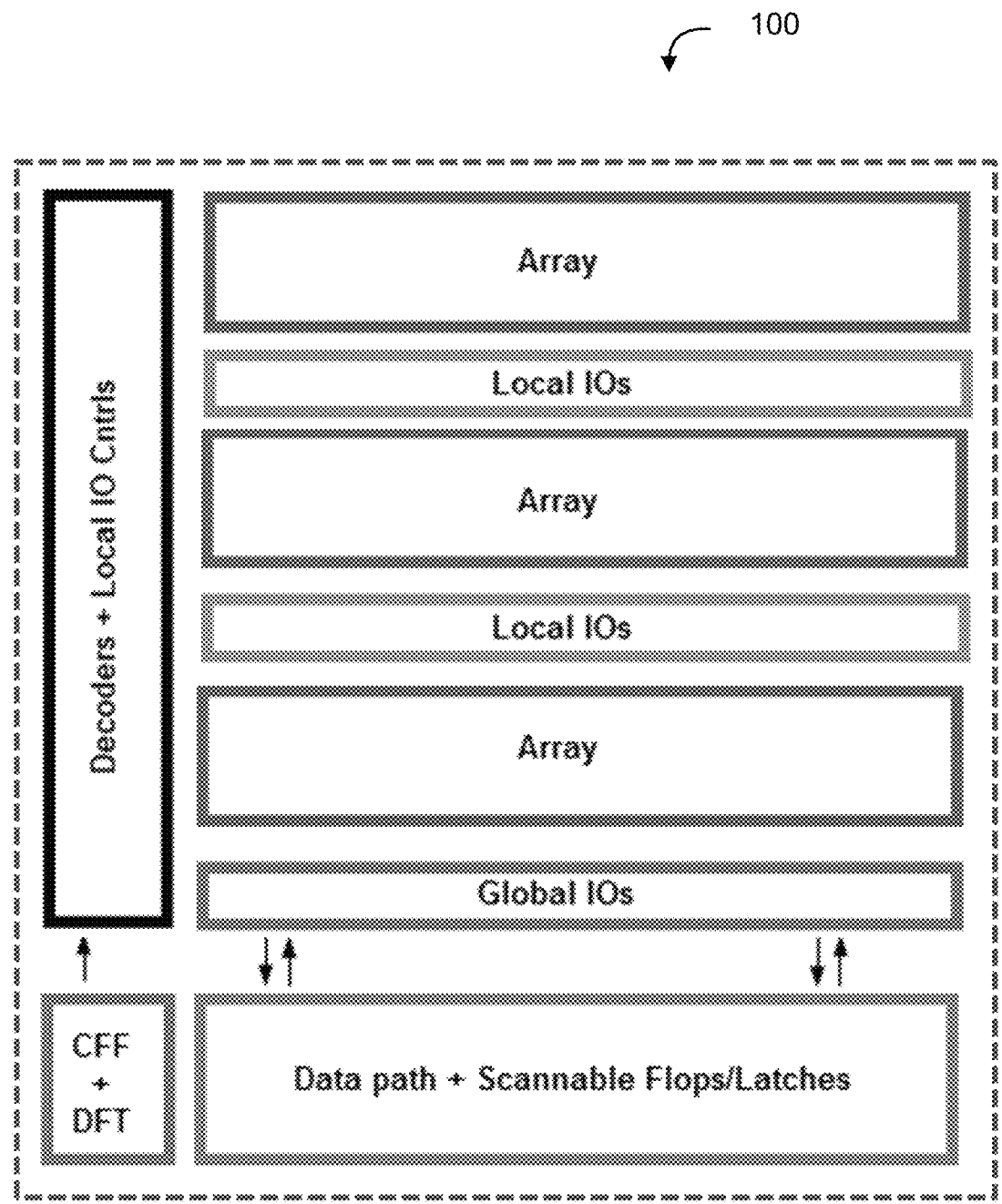
FIG. 1 shows an illustrative custom static random access (SRAM) full block architecture, as a context for various embodiments described herein.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Many custom circuit designs involve several timing margin checks to ensure desired functionality. Some single-path checks, such as delay margin checks, can be simple and successfully performed (albeit often with severe pessimism) using conventional corner methodologies. However, in some applications (e.g., memory designs including critical timing checks involving races between multiple paths), such conventional corner-based margin methodologies can be both pessimistic (leading to over-design) and optimistic (exposing under-design) as compared to actual circuit behavior. This can tend to result in circuit designs that are overly complicated, overly expensive, and/or otherwise sub-optimal.

Guard bands derived from conventional corner analysis do not tend to be applicable for timing checks that can involve a race between multiple signal paths. On-chip variation (OCV) can affect different paths differently, thereby rendering worst-case corner based margin estimates severely inadequate. Some other conventional approaches include other de-rate based approaches, such as AOCV (Advanced On Chip Variation); and practical statistical static timing analysis (SSTA) approaches, such as POCV (Parametric On Chip Variation). Such approaches are static and only tend to be applicable for pre-characterized (e.g., standard-cell-based) designs. Both corner based and de-rate based approaches are typically insufficient for custom circuits, such as SRAM (Static Random Access Memory), which tend to be more complex than standard cells and to contain timing checks that involve races between multiple signal paths.

Embodiments described herein include novel techniques for timing-sensitive path extraction to be used in transistor-level statistical analyses for complex timing margin checks. Implementations can involve additional features, such as automatic timing-sensitive netlist extraction, test-bench generation, and statistical design simulations. Embodiments described herein can statistically estimate complex timing margins under process variations and can be employed during various stages of design, including from early feasibility stage through post-layout. Such non-static statistical approaches can overcome inadequacies of static approaches by accurately mimicking the effect of OCV on racing paths and can help ensure functional designs; and embodiments described herein can apply such non-static statistical approaches in a manner that is practical for more complex applications. For example, such embodiments can enable design of more robust, variation-aware, custom circuits (e.g., for use in higher-performance applications, more complex systems, analog systems, mixed signal systems, etc.).

For the sake of context, there are various conventional approaches to timing margin checks used to achieve robust custom circuit designs. Within that context, variations (e.g., device process variations) can be classified as global variations (e.g., on-die as well as inter-die, including die from different wafers and different wafer lots) and local variations (e.g., within-die or intra-die). The global variations can equally affect parameters of all devices on a particular chip, for example, when gate length variations of all the devices on the same chip are larger or smaller than the nominal value. Local variations tend to affect the parameters of each individual device on a chip in a different manner. Further, local systematic variations can affect devices differently, depending on whether these devices are placed near or far away from each other. For example, some devices on a die have smaller gate lengths, whereas other devices on the same die have larger gate lengths.

Statistical approaches have evolved over time to effectively analyze variations and associated effects. Considerable amounts of existing and ongoing research addresses design-specific traits, such as variability aware design, statistical timing analysis, statistical cell characterization, statistical leakage prediction, statistical path selection, and variability aware sub-threshold/near-threshold design. Recently, researchers have started addressing test-specific traits, such as variability-aware fault modeling, delay testing, and delay validation. Some prevalent industry practices use de-rate factors to account for On Chip Variations (OCV) in their design flows. There tends to be a trade-off between complexity and accuracy for these conventional approaches, such that more accuracy comes with more complexity. Static Timing Analysis (STA) tends to be the most simple (and completely variation-unaware) approach, but tends also to be the least accurate; while Statistical Static Timing Analysis (SSTA) tends to involve complex characterizations and timers, but tends to be the most accurate. Other conventional approaches tend to be attempts to bridge the gap between STA and SSTA, with particular balances between practical runtimes (e.g., lower complexity) and acceptable accuracy. For example, the baseline model On-Chip Variation (OCV) tends to use a uniform global de-rate (which can tend also to represent worst-case bounding). That baseline model can be extended to Advanced On-Chip Variation (AOCV), which uses depth-based de-rate to better account for global variations; Location based On-Chip Variation (LOCV), which uses location-based de-rate to better account for local variations; etc. These conventional OCV methodologies for statistical analysis have tended to focus on gate-level analysis. Recent research into enabling sigma-variation-based practical approaches for sub-20 nm technology nodes have led to lightweight statistical margining approaches, such as Parametric On Chip Variation (POCV) and Statistical On chip Variation (SOCV). Growing interests in the statistical domain has also led to standardization efforts relating to LVF (Layout Variation Format). Though such methodologies can be adopted for pre-characterized standard-cell based designs, they tend to be poorly suited for custom designs containing custom cells and arrays. As a result, deterministic, multi-corner analysis remains the predominant methodology for custom circuit analysis in the industry.

FIG. 1 shows an illustrative custom design full block 100, as a context for various embodiments described herein. For example, the full block 100 can be an implementation of a custom SRAM, or other suitable circuit. As illustrated, the custom design full block can include major components, such as control flops (CFF), Design for Test modules (DFT), decoders, local and/or global input/output structures (IOs), data flops, and memory arrays. In the context of current and emerging computing systems, processors and memories are two major components in state-of-the-art integrated circuit designs. Though memories typically include regular structures, they often include custom blocks, such as the one illustrated in FIG. 1, so that their designs tend to involve complex methodologies and flows (as compared to standard cell-centric processor designs). Most control signals are typically generated internally from the primary clock in the CFF module, and those signals can rely on strict timing checks to ensure proper functionality. The timing checks can be categorized as: Frequency Dependent Margin (FDM), Self-Timed Margin (STM), Crowbar Margin (CBM), and Delay Margin (DM) (and/or other suitable categorizations). Critical timing checks in a custom design can include FDM, STM, and CBM, which can involve a race between two paths. The signals can be generated from a common clock point (reference clock), but can be launched from different (e.g., FDM) or same (e.g., STM, CBM) edges.

Figures 2A, 2B, 2C:
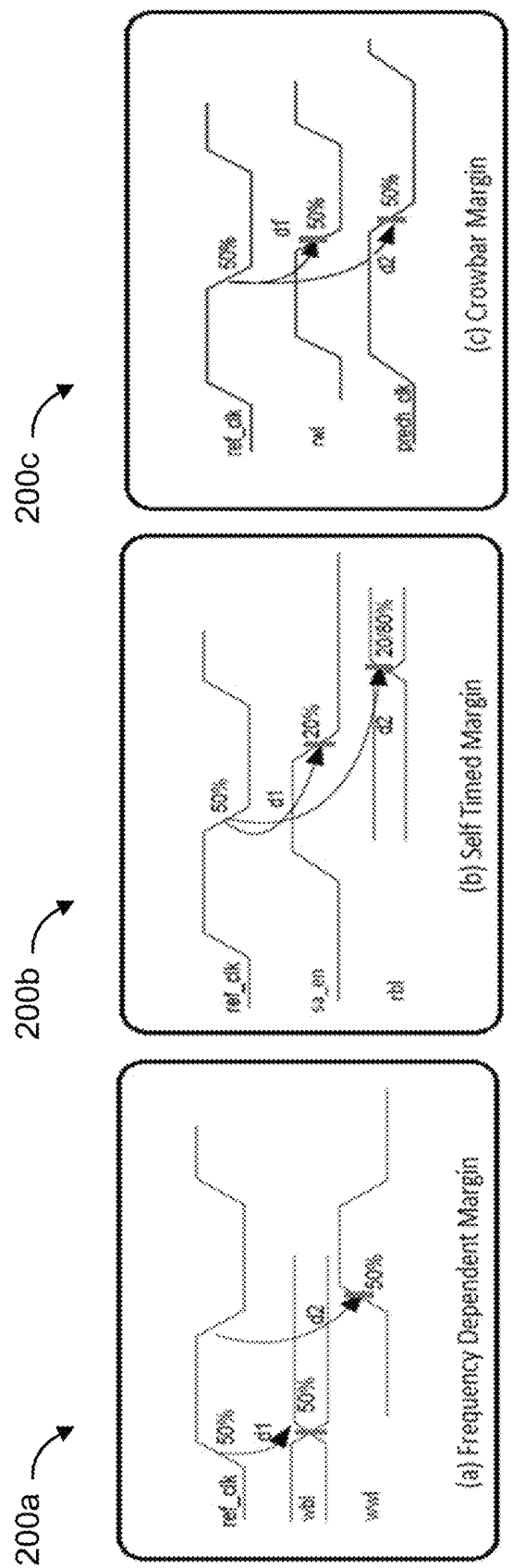
FIGS. 2A-2C show simplified timing diagrams of illustrative timing check scenarios involving different types of margins.

FIGS. 2A-2C show simplified timing diagrams of illustrative timing check scenarios 200 involving different types of margins. FIG. 2A shows a FDM scenario 200a for writability check (ensuring Write After Write (WAW) hazard is prevented), where the second write (indicated by write word line (wwl) going high–d2) can occur only after the first write has finished (indicated by write bit line (wbl) reaching 0.5 VDD–d1). Since the two signals wwl and wbl are launched from different clock edges, such races can be controlled by adjusting the clock frequency and are called Frequency Dependent Margins, accordingly. FIG. 2B shows a STM scenario 200b for staticizer latch mintime check (ensuring Write After Write (WAW) hazard is prevented), where the data input of latch (indicated by read word line (rwl) reaching 0.2 VDD for a read 0 operation–d2) can occur only after the latch clock has finished (indicated by sense enable (sa_en) reaching 0.2 VDD–d1). Since the two signals sa_en and rbl are launched from the same clock edge, such races can be called Self Timed Margin (STM). Because these races cannot be fixed by altering the clock frequency, STM checks can be important in many instances (or even critical) to ensure functionality of SRAM circuits. FIG. 2C shows a CBM scenario 200c to calculate the amount of allowable crowbar at footless dynamic circuits. Such can ensure that bit-line precharge (prech_clk) is ON (prech_clk being active low falls to 0.5 VDD) only after read word line (rwl) shuts OFF (rwl falls to 0.5 VDD−d1). CBMs are similar to STMs (both d1 and d2 launched off same clock edge) and can be critical for memory designs with single-ended sensing. DM can provide a very simple (e.g., potentially the simplest) margin check as the margin associated with the delay of a single signal, such as read word line (rwl) from the reference clock (ref_clk). Embodiments described herein largely focus on FDM, STM, CBM and/or other critical timing checks that involve races between multiple paths; though embodiments can be applied wherever suitable.

One aspect of a deterministic methodology is establishment of metrics for comparison, validation, etc. Some deterministic methodologies relating to timing checks use a Figure Of Merit (FOM). The FOM can be established in terms of a difference between path delays of racing paths, and a guard-band (GB) can be provided on top of the metric to ensure functionality under variation. For example, the FOM can be computed as:

$$FOM=(d2-d1)/(d2+d1).$$

In conventional corner methodology, the guard band can be computed by taking a minimum of FOM across all corners, for example, as:

$$GB=\min(\forall \text{corner FOM}).$$

In contrast, embodiments described herein seek more accurate guard-band characterizations by avoiding the types of excessive optimism and/or pessimism associated with conventional corner methodologies.

Embodiments herein include a practical transistor level statistical approach for timing margin checks. Some implementations can include and/or can facilitate timing-sensitive netlist extraction, test-bench generation, statistical simulations on the design, etc. Some embodiments consider both global and local variations, which can also be referred to as chip mean and mismatch variations, respectively. Some embodiments can be parallelized across various processors (e.g., as sampling and simulation steps can be separate and independent), and can also make use of multi-threaded solver to further reduce runtime.

Embodiments of the novel timing-sensitive circuit extractor described herein can take pre- or post-layout netlists and automatically generate a timing-sensitive netlist. Timing checks and corresponding stimuli can generally be pre-defined, and a test-bench generator can generate appropriate parameters, stimuli, etc. (e.g., a statistical spice deck with global and local variation parameters, appropriate input stimuli and measure statements, etc.). Statistical simulations (e.g., that can be parallelized across multiple processors) can then be performed to quickly generate results, which can be post-processed to obtain timing margin distributions and to flag out design errors.

Figure 3:
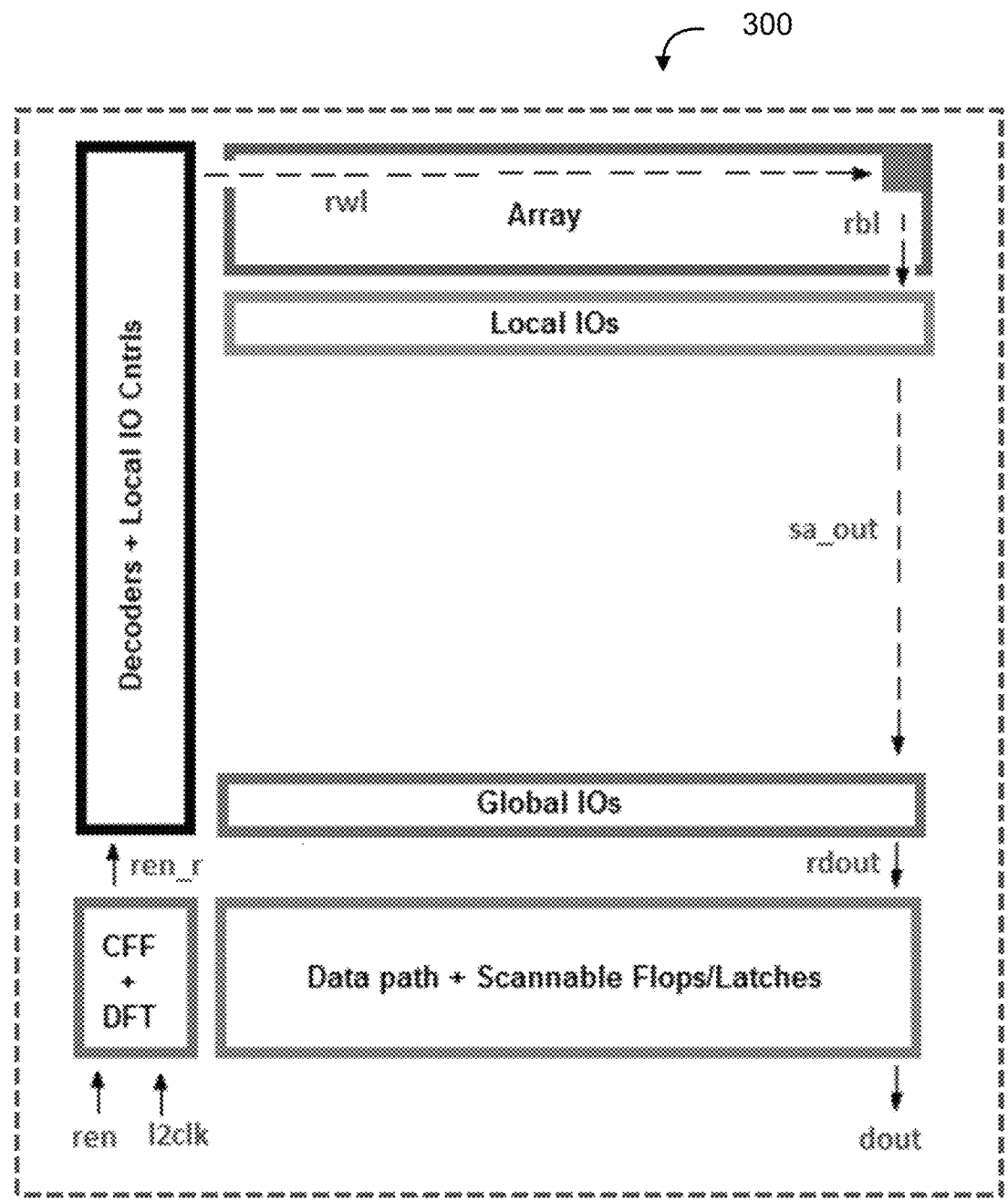
FIG. 3 shows a custom partial block design to illustrate a timing-sensitive path, such as through the custom full block design of FIG. 1.

According to some embodiments, large runtime resources and/or memory typically consumed by simulations of large designs can be addressed through timing-sensitive netlist extraction (i.e., netlist reduction). Paths of interest can be carved out from the full design through novel netlist reduction approaches. As described herein, embodiments can generally create smaller blocks from a custom full block design, generate connectivity diagrams between the blocks, and identify a timing-sensitive path through the blocks. For example, FIG. 3 shows a custom partial block design 300 to illustrate a timing-sensitive path, such as through the custom full block design of FIG. 1. The illustrated timing-sensitive path corresponds to a read margin that include signals, such as read enable (ren), read word line (rwl), read bit line (rbl), sense amplifier output (sa_out), and data out (dout). Devices and loads relevant to the paths corresponding to the margin of interest can be extracted to create a smaller netlist, and the resulting reduced netlist may be simulated in a fraction of the time and/or using a fraction of system resources as compared to the original design. Some embodiments include automatic extraction of a timing-sensitive circuit that corresponds to the timing-sensitive path.

As noted above, some embodiments also include automatic test bench generation. Global variations can affect each circuit instance of statistical run, whereas local variations can affect each device/transistor instance within that single circuit instance. Implementations can include an infrastructure for incorporating global and local variation on transistors and/or other devices. Also, custom block simulations generally have pre-defined stimulus and pre-defined probe pins. Based on provided information, implementations can include a novel user interface to generate the types of data (e.g., statistical spice deck) for a test-bench.

Figure 4:
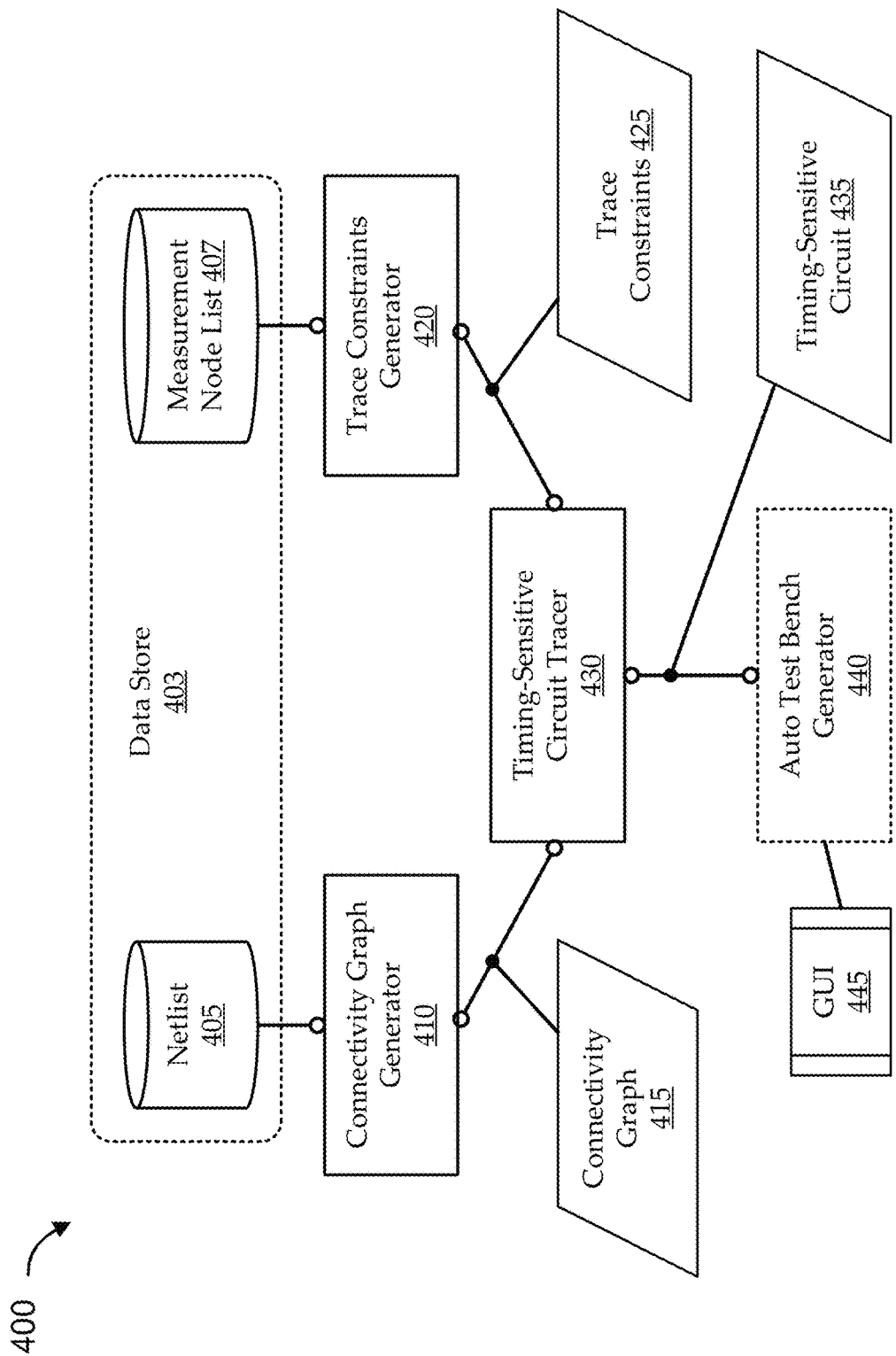
FIG. 4 shows a block diagram of an illustrative timing-sensitive circuit extraction system, according to various embodiments.

FIG. 4 shows a block diagram of an illustrative timing-sensitive circuit extraction system 400, according to various embodiments. As illustrated, embodiments of the timing-sensitive circuit extraction system 400 can include a connectivity graph generator 410, a trace constraints generator 420, and a timing-sensitive circuit tracer 430. Generally, the connectivity graph generator 410 automatically generates a connectivity graph 415 to classify an integrated circuit, the trace constraints generator 420 derives trace constraints 425 for signal paths through the integrated circuit, and the timing-sensitive circuit tracer 430 performs a graph traversal through the connectivity graph 415 with the trace constraints 425 to derive a timing-sensitive circuit 435 for a timing-sensitive signal path (e.g., a read data and control path) through the integrated circuit.

In some embodiments, the system 400 includes a non-transient circuit data store 403 having, stored thereon, a netlist 405 defining circuit blocks of an integrated circuit, and a measurement node list 407 defining measurement nodes and respective margin definitions. For example, a circuit designer designs the integrated circuit (e.g., a custom circuit) as multiple circuit blocks that perform circuit functions (e.g., as illustrated in FIG. 1), each defined in the netlist 405 according to its inputs and/or outputs, internal functionality, etc. The circuit designer can also define particular measurement nodes (e.g., probe locations) for measuring signals in the integrated circuit, and those measurement nodes can be stored in the measurement node list 407.

Embodiments of the connectivity graph generator 410 can include a netlist input that is coupled with the circuit data store 403. For example, the netlist input of the connectivity graph generator 410 can operate to receive the netlist 405. The connectivity graph generator 410 can also include a connectivity graph output that has a connectivity graph 415 generated automatically to define interconnections between the plurality of circuit blocks of the integrated circuit according to the netlist input. According to some embodiments, the connectivity graph generator 410 operates to generate the connectivity graph 415 automatically by partitioning the netlist 405 of the integrated circuit according to a predefined architecture model to define the plurality of circuit blocks. For example, the architecture model can be stored in the circuit data store 403 and can include parameters and characteristics predefined for the particular integrated circuit and/or for the type of integrated circuit. For example, a memory block's regular structure may be predefined to include at least control flops (CFFs), design for test (DFT), decoders, local and global IOs, memory array, and data flops.

Various of the circuit blocks in the netlist 405 can follow identifiable patterns that indicate the type of circuit block. For example, flops and latches may follow a pattern that is automatically differentiable from that of a sense amplifier cell, and both may be automatically differentiable from that of a simple combinatorial logic block. Some implementations of the connectivity graph generator 410 can generate the connectivity graph 415 automatically by pattern matching the netlist 415 using stop cells, or the like, to define various portions of the blocks according to their respective patterns. For example, a first portion of the circuit blocks can be automatically classified as grey-box components (e.g., flops, latches, clock headers, etc.), and a second portion of the circuit blocks can be automatically classified as black-box components (e.g., sense array cells, array bit cells, etc.). In some embodiments, the circuit data store 403 can store full table files and/or dummy table files. Some or all of the classified grey-box components can be defined according to respective ones of the stored full table files, and/or some or all of the black-box components can be defined according to respective ones of the stored dummy table files. An example of a full table file for a grey-box component is as follows:

```
table grey_cell_v1
    inputs      : d : data ;
    inputs      : clk : clock ;
    outputs     : q : data ;
    terms
        delay_arc : clk q ;
        [1r]     : r ;
    end_terms
end_table
```

In some embodiments, the connectivity graph is further generated automatically by generating a side input sensitization for some or all of the grey-box components according to their respective full table files. An example of a dummy table file for a black-box component is as follows:

```
table black_cell_v1
    inputs      : in1, in2 : data ;
    outputs     : out1 : data ;
    terms
        delay_arc : in1 out1 ;
        [r-]     : r ;
        delay_arc : in2 out1 ;
        [-r]     : r ;
    end_terms
end_table
```

Some embodiments can generate the connectivity graph 415 by automatically classifying combinatorial logic functions of some of the circuit blocks. Implementations of the connectivity graph generator 410 can use channel-connected region (CCR) partitioning to perform the automatic classification of simple combinatorial logic functions. For example, decoder blocks, pre-decoder blocks, and/or the like, can be classified as multiple combinatorial logic blocks.

Figure 5:
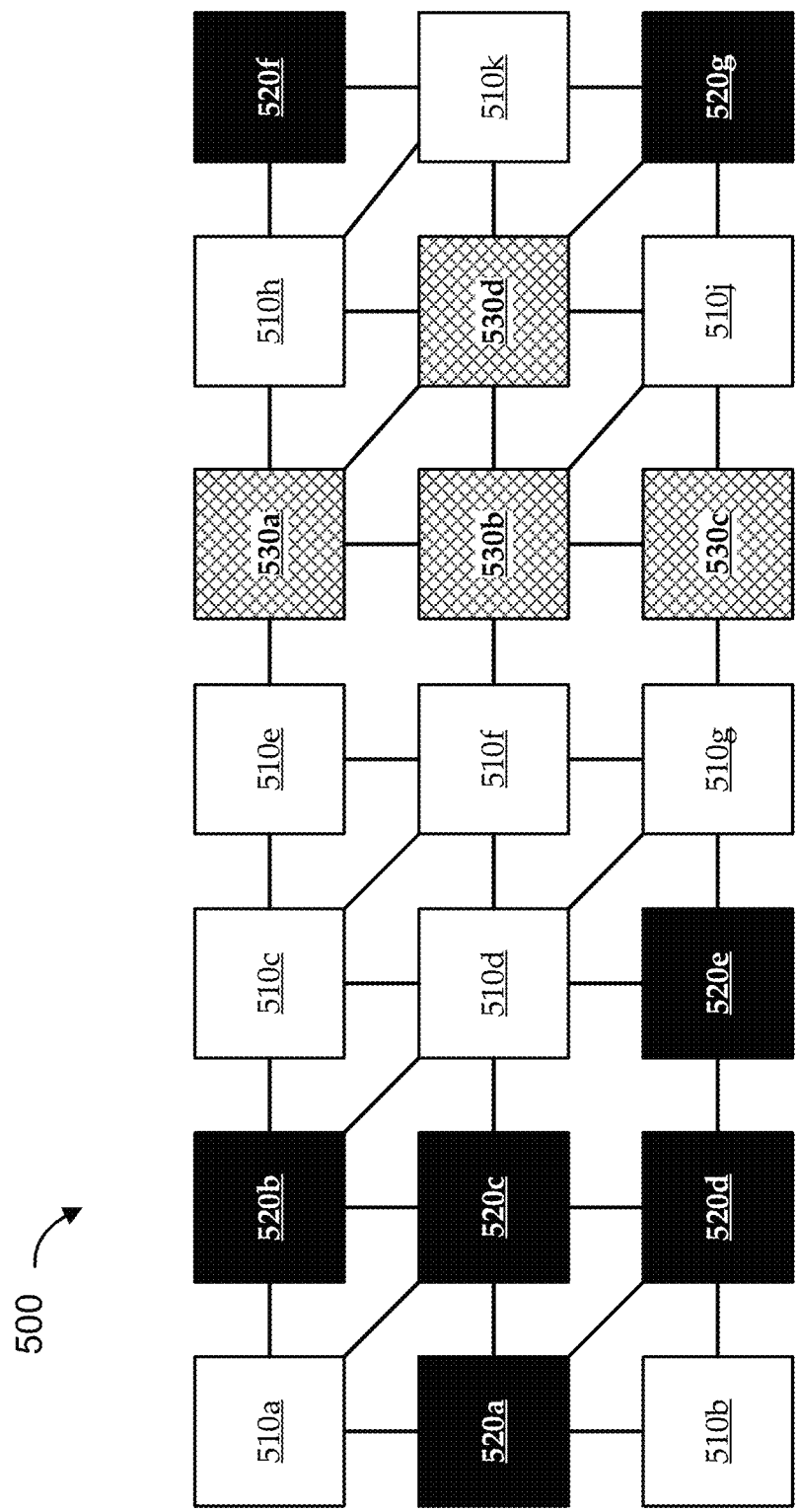
FIG. 5 shows an example diagram of a connectivity graph automatically derived from an integrated circuit, such as the circuit of FIG. 1, according to various embodiments.

For the sake of illustration, FIG. 5 shows an example diagram 500 of a connectivity graph 415 automatically derived from a custom circuit, such as the circuit of FIG. 1, according to various embodiments. The illustrated diagram 500 includes various types of automatically classified circuit blocks and illustrates the connections between those circuit blocks. As shown, the connectivity graph 415 includes "red" blocks 510 classified by CCR partitioning, "black" boxes 520 classified using stop cells (e.g., and defined using full table files), and "grey" boxes 530 classified using stop cells (e.g., and defined using dummy table files). Each circuit block includes multiple inputs and outputs (IOs) that correspond to the connectivity of the integrated circuit.

Returning to FIG. 4, embodiments of the trace constraints generator 420 can include a measurement node input coupled with the circuit data store 403. For example, the measurement node input of the trace constraints generator 420 can operate to receive the measurement node list 407. The trace constraints generator 420 can also include a trace constraints output that has trace constraints 425 automatically identified, according to the measurement node input, as associated with a predefined data path between a primary input node of the integrated circuit and a primary output node of the integrated circuit. For example, the identified trace constraints 425 correspond to the respective margin definitions at multiple of the measurement nodes in the predefined data path.

Figure 6A:
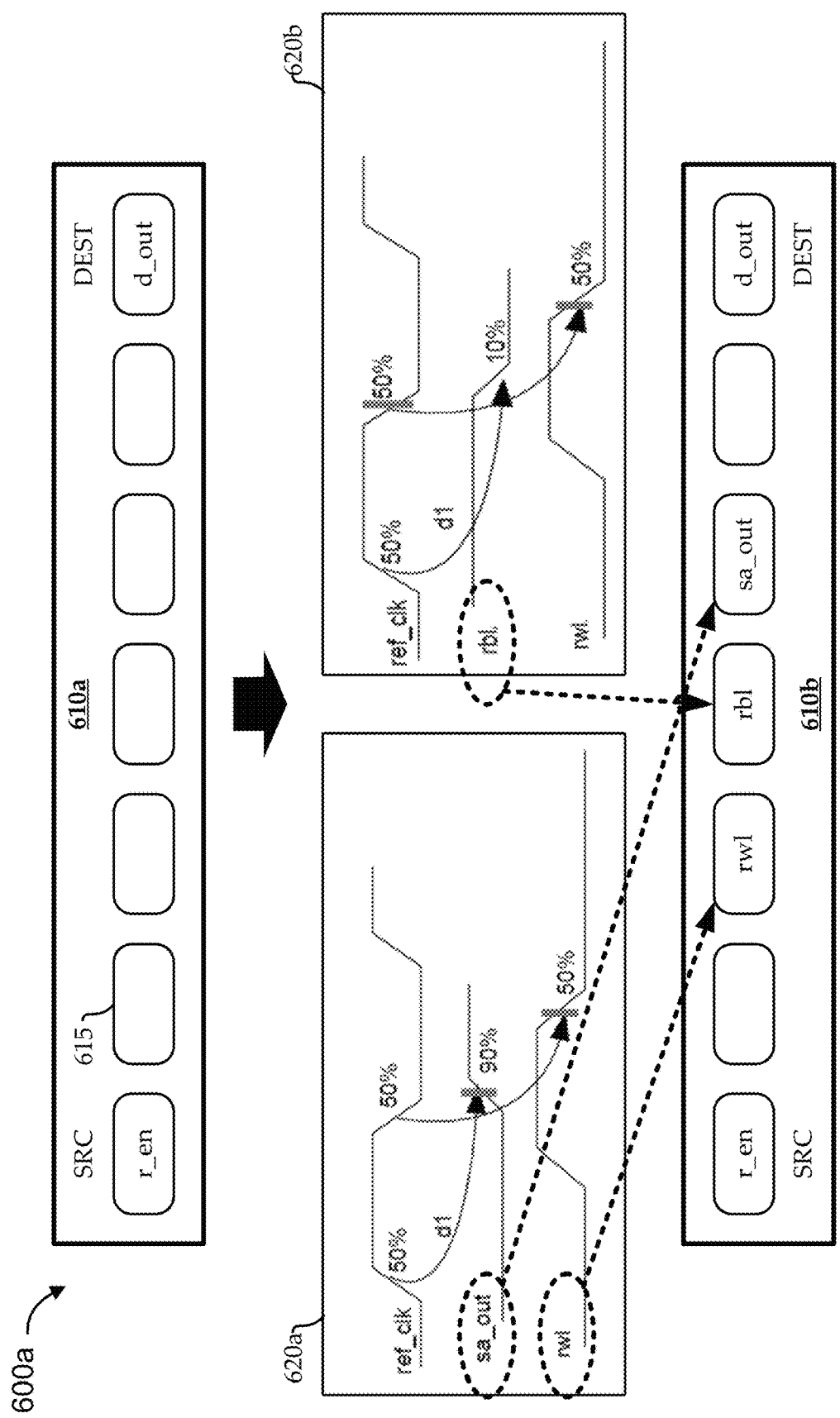
FIGS. 6A and 6B show an example of automatic identification of trace constraints for a timing-sensitive read path through an integrated circuit, according to various embodiments.
Figure 6B:
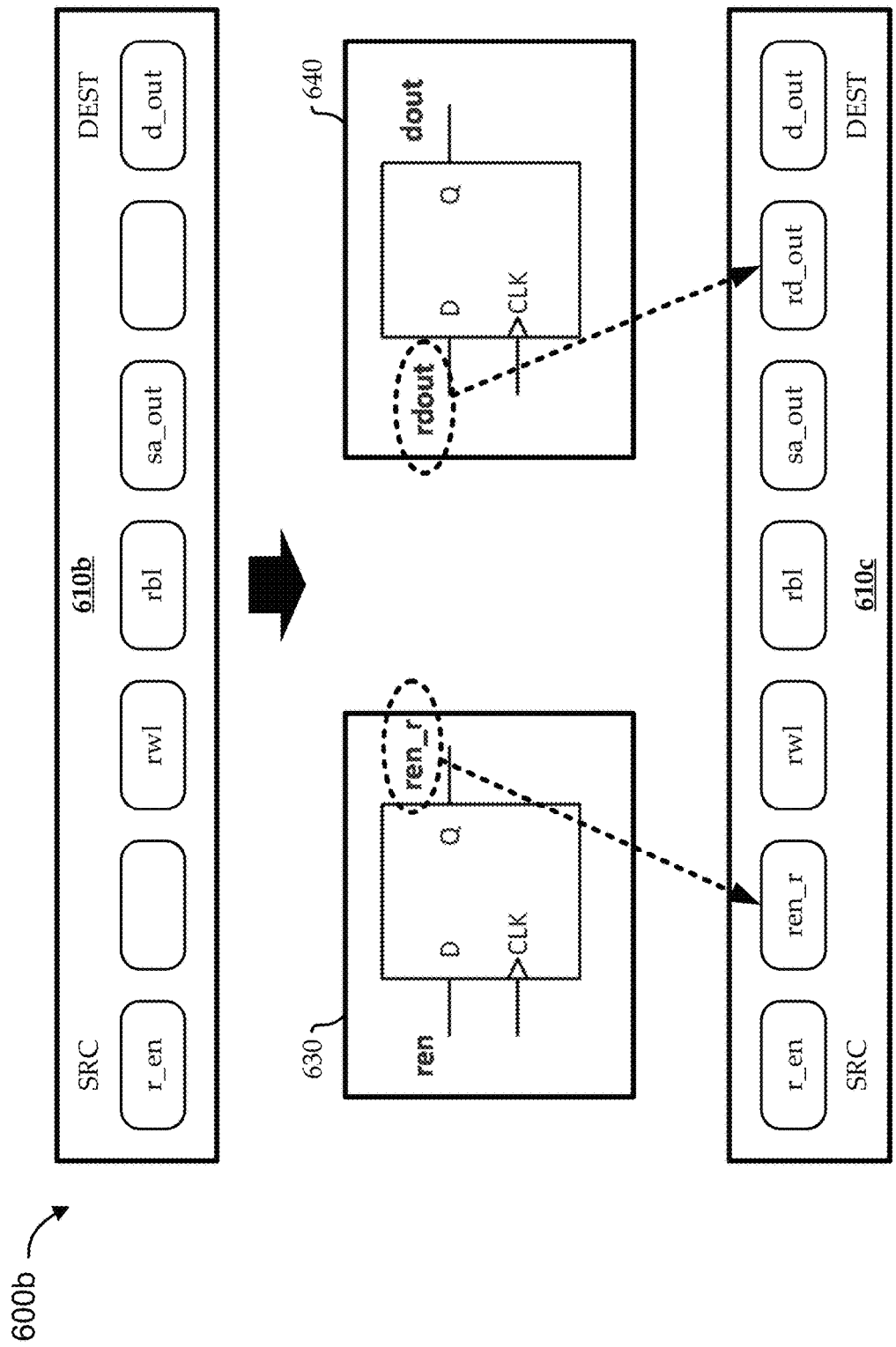

For the sake of illustration, FIGS. 6A and 6B show an example of automatic identification of trace constraints 425 for a timing-sensitive read path through an integrated circuit, according to various embodiments. Embodiments seek to identify a sequence 610 of through-nodes 615 between a source node and a destination node of the timing-sensitive path of interest. In the illustrated timing-sensitive read path case (e.g., a read data and control path), the source node is predefined as a read enable node (r_en), and the destination node is predefined as a data out node (d_out). For example, an initial sequence 610a shows only the source and destination nodes with the through-nodes undefined. The integrated circuit definition includes various margin definitions associated with various critical measurements, and those measurements are associated with certain locations (e.g., probe locations, measurement nodes, etc.) in the integrated circuit. For the illustrated timing-sensitive read path, two critical measurements are predefined: a first read completion check 620a; and a second read completion check 620b. Each read completion check 620 is defined by one or more critical measurements and one or more associated margin definitions. For example, as illustrated, the first read completion check 620a is defined according to a read wordline measurement (rwl) and a sense amplifier output measurement (sa_out); and the second read completion check 620b is defined according to a read bitline measurement (rbl). The three identified critical measurements can be used to define three of the through-nodes 615 in the timing-sensitive read path, as illustrated by updated sequence 610b.

While the critical measurements can be used to define some of the through-nodes 615, others of the through-nodes may remain undefined. For example, sequence 610b shows the first and last through-nodes 615 in the sequence 610 as undefined. As illustrated in FIG. 6B, the sequence 610 of through-nodes 615 between the primary input node and the primary output node can be further defined by executing a forward topological search 630 from the primary input node to define a first through-node 615 in the sequence and by executing a backward topological search 640 from the primary output node to define a last through-node 615 in the sequence. As indicated by updated sequence 610c, all the through-nodes 615 are defined for the timing-sensitive read path.

Returning again to FIG. 4, embodiments of the timing-sensitive circuit tracer 430 can include a connectivity graph input coupled with the connectivity graph output of the connectivity graph generator 410, and can include a trace constraints input coupled with the trace constraints output of the trace constraints generator 420. For example, the timing-sensitive circuit tracer 430 can operate to receive the generated connectivity graph 415 and the identified trace constraints 425. The timing-sensitive circuit tracer 430 can also include a timing-sensitive circuit output that has a timing-sensitive circuit 435 defined by a subset of the connectivity graph 415 having the circuit blocks of the integrated circuit corresponding to a sequence of through-nodes automatically defined between the primary input node and the primary output node, according to the trace constraints input and the connectivity graph input.

Figure 7:
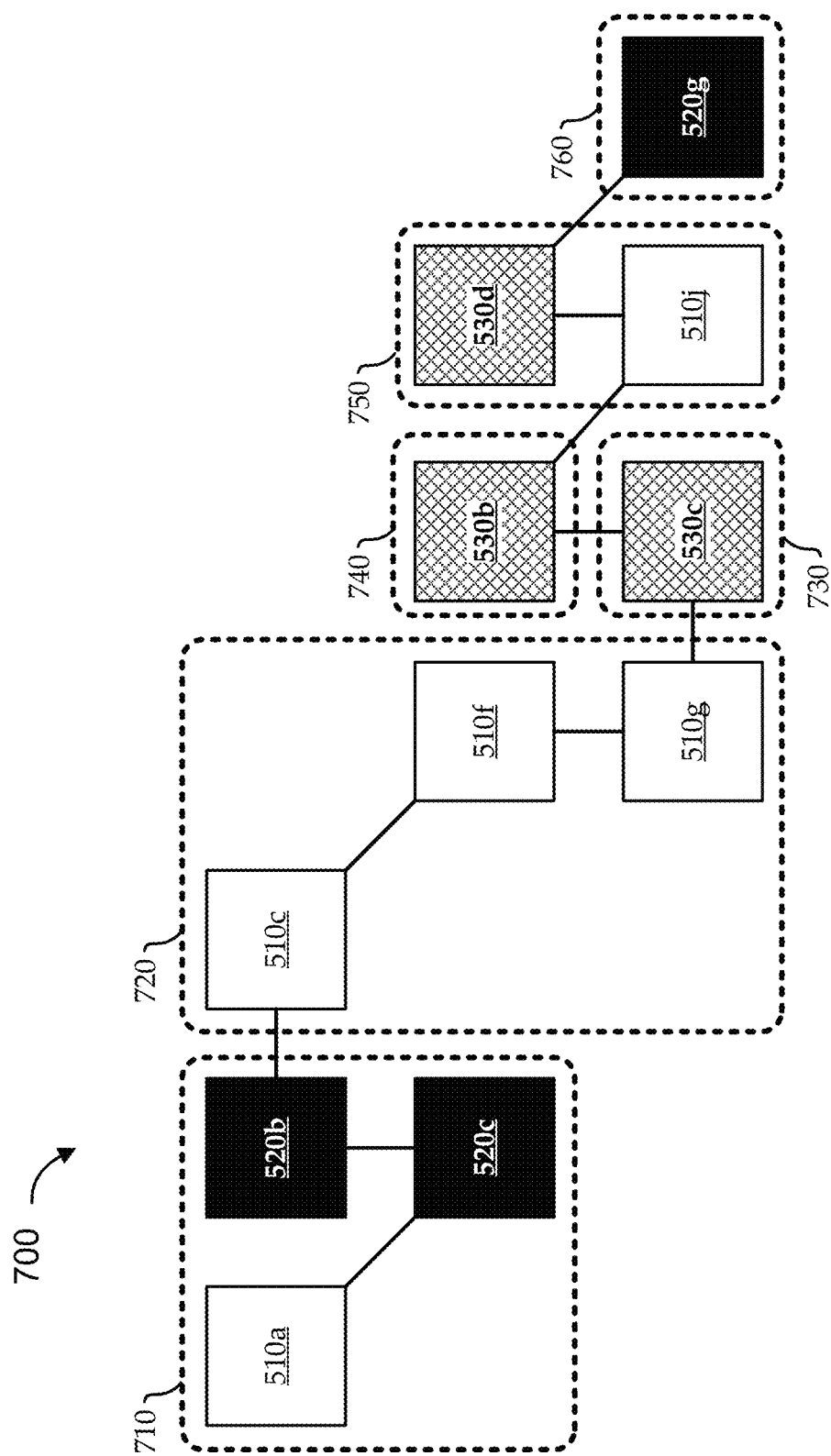
FIG. 7 shows a diagram of a timing-sensitive path extracted from the connectivity graph, according to various embodiments.

For the sake of illustration, FIG. 7 shows a diagram 700 of a timing-sensitive path extracted from the connectivity graph 415, according to various embodiments. The diagram 700 shows that the path includes a subset of the circuit blocks from the connectivity graph diagram 500 of FIG. 5, and the subset includes those blocks corresponding to the identified sequence of nodes. In some embodiments, the timing-sensitive path is automatically generated by performing a graph traversal through the connectivity graph 415 using the trace constraints 425 to confine the traversal. For example, a depth first search (e.g., or any other suitable traversal) of the connectivity graph 415 can be confined by the trace constraints 425 to derive the timing-sensitive path.

Figure 8:
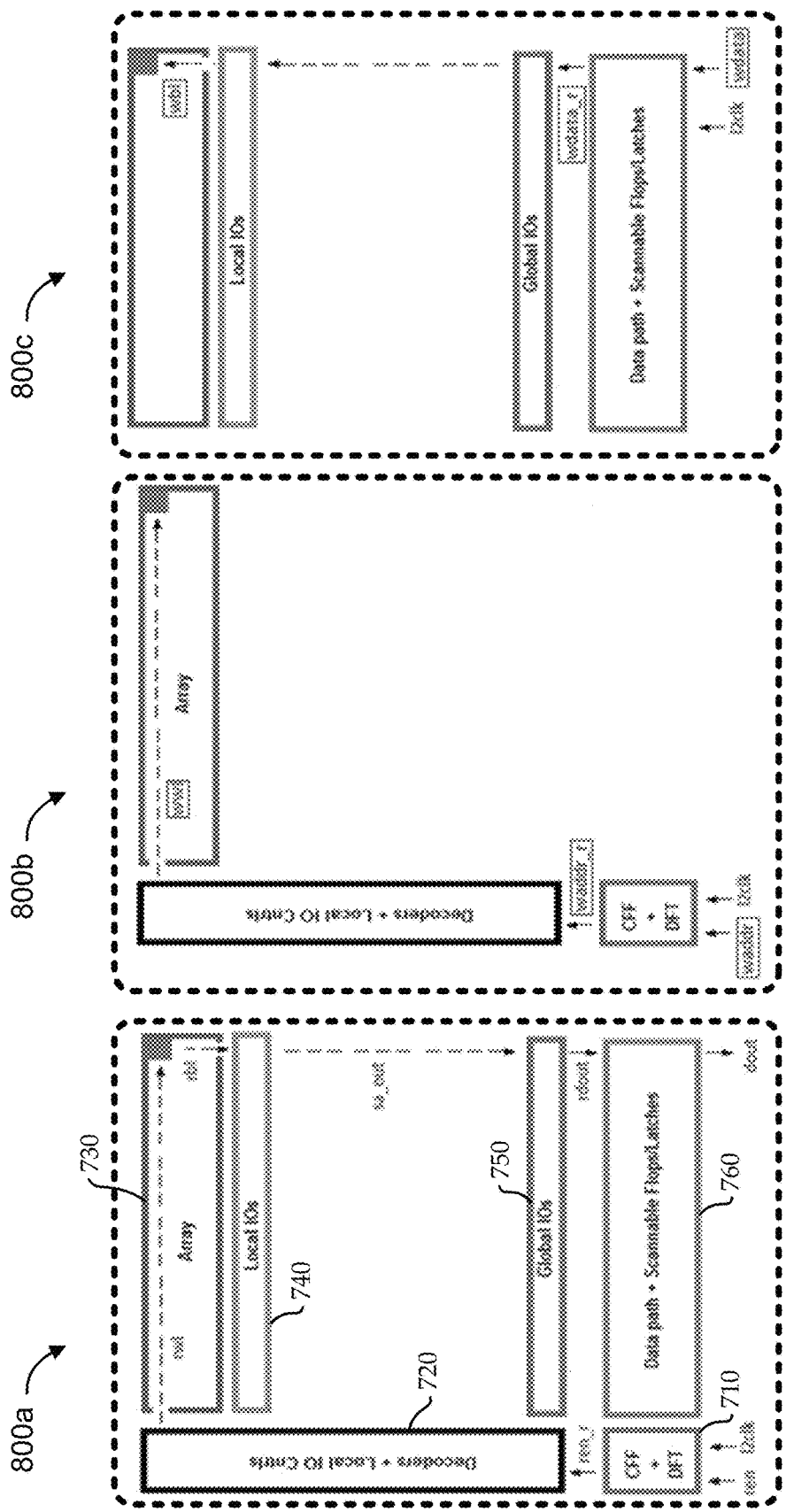
FIGS. 8A-8C show illustrative timing-sensitive circuits that can be derived from the integrated circuit of FIG. 1.

Associations between the circuit blocks of the connectivity graph 415 and the components of the integrated circuit can be used to derive the timing-sensitive circuit 435. FIG. 8A shows an illustrative timing-sensitive circuit 800a for the timing-sensitive read path derived in FIGS. 6A, 6B, and 7. As illustrated, the timing-sensitive circuit 800a begins at a CFF and DFT block 710 that includes circuit blocks 510a, 520c, 520b; representing the path between the source node (r_en) and the first through-node 615 of the sequence (ren_r). The timing-sensitive circuit 800a continues with a decoders and IO controls block 720 that includes circuit blocks 510c, 510f, 510g; representing the path between the first through-node 615 (ren_r) and the second through-node 615 (rwl). The timing-sensitive circuit 800a continues with an array block 730 that includes circuit block 530c; representing the path between the second through-node 615 (rwl) and the third through-node 615 (rbl). The timing-sensitive circuit 800a continues with a local IOs block 740 that includes circuit block 530b; representing the path between the third through-node 615 (rbl) and the fourth through-node 615 (sa_out). The timing-sensitive circuit 800a continues with a global IOs block 750 that includes circuit block 530d; representing the path between the fourth through-node 615 (sa_out) and the fifth through-node 615 (rd_out). The timing-sensitive circuit 800a continues with a data path and scannable flops and latches block 760 that includes circuit block 520g; representing the path between the fifth through-node 615 (rd_out) and the destination node (d_out).

FIGS. 8B and 8C show two other illustrative timing-sensitive circuits that can be derived from the integrated circuit of FIG. 1. Automatically identifying the trace constraints can involve automatically identifying multiple data paths between the primary input node of the integrated circuit and a primary output node of the integrated circuit. The multiple timing-sensitive paths can include any suitable path, such as a timing-sensitive read path (e.g., read data and/or read control paths) and a timing-sensitive write path (e.g., write control and/or write data paths). For example, FIG. 8B shows an illustrative write control circuit corresponding to a timing-sensitive write control path, and FIG. 8C shows an illustrative write data path corresponding to a timing-sensitive write data path.

Figure 9:
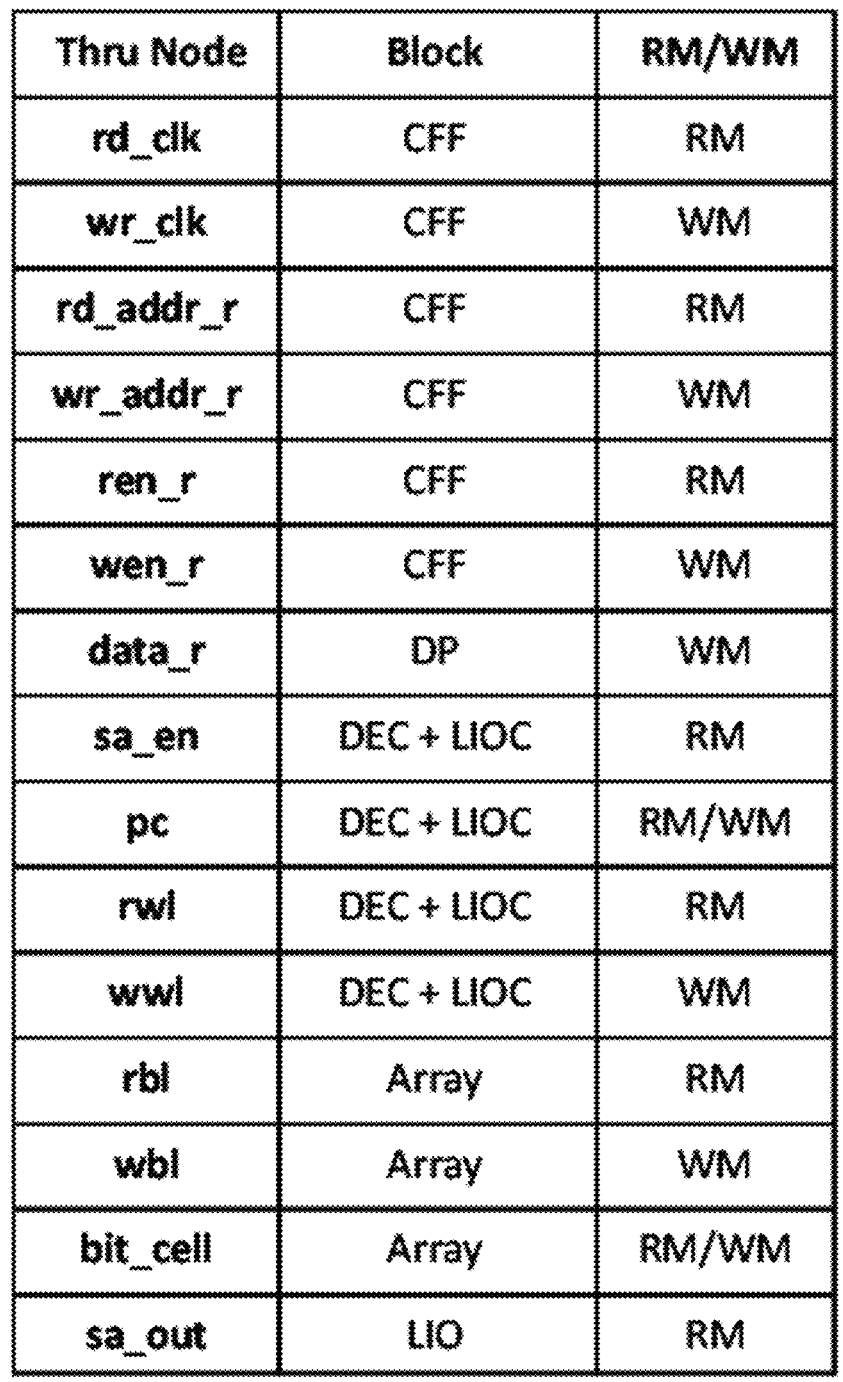
FIG. 9 shows an illustrative timing-sensitive netlist derived from the integrated circuit of FIG. 1 to include the timing-sensitive read and write paths of FIGS. 8A-8C.

In some embodiments, the one or more derived timing-sensitive circuits can define a timing-sensitive netlist. FIG. 9 shows an illustrative timing-sensitive netlist 900 derived from the integrated circuit of FIG. 1 to include the timing-sensitive read and write paths of FIGS. 8A, 8B, and 8C. The timing-sensitive netlist 900 shows identified through nodes, associations between the through-nodes and blocks of the integrated circuit, associations between through-nodes and read or write path, and/or any other suitable information.

Returning again to FIG. 4, some embodiments of the automatic timing-sensitive circuit extraction system 400 further include an automatic test bench generator 440. Embodiments of the automatic test bench generator 440 can include a timing-sensitive circuit input coupled with the timing-sensitive circuit output of the timing-sensitive circuit tracer 430. For example, the automatic test bench generator 440 can operate to receive the timing-sensitive circuit 435, side node sensitization data, etc. Embodiments can further include a test-bench output that has a subset of the circuit blocks automatically identified as side-input nodes and stimuli for application to the side-input nodes. For example, some or all of the stimuli can be automatically generated according to the side input sensitizations. In some embodiments the automatic test bench generator 440 further generates a user interface (e.g., GUI 445) for generation of test bench data.

In conventional test bench generation, a user typically manually writes input stimuli to be applied at primary nodes, measure statements, and initial conditions. In contrast, the automatic test bench generator 440 can use pre-defined multiple cycle stimuli (e.g., for a memory design) to automatically define stimuli at primary inputs and initial conditions at array bit cells. Further, embodiments of the automatic test bench generator 440 can use pre-defined margin definitions (e.g., typical definitions for the memory design or other appropriate circuit) to automatically populate measure statements into pre-defined templates.

Figure 10:
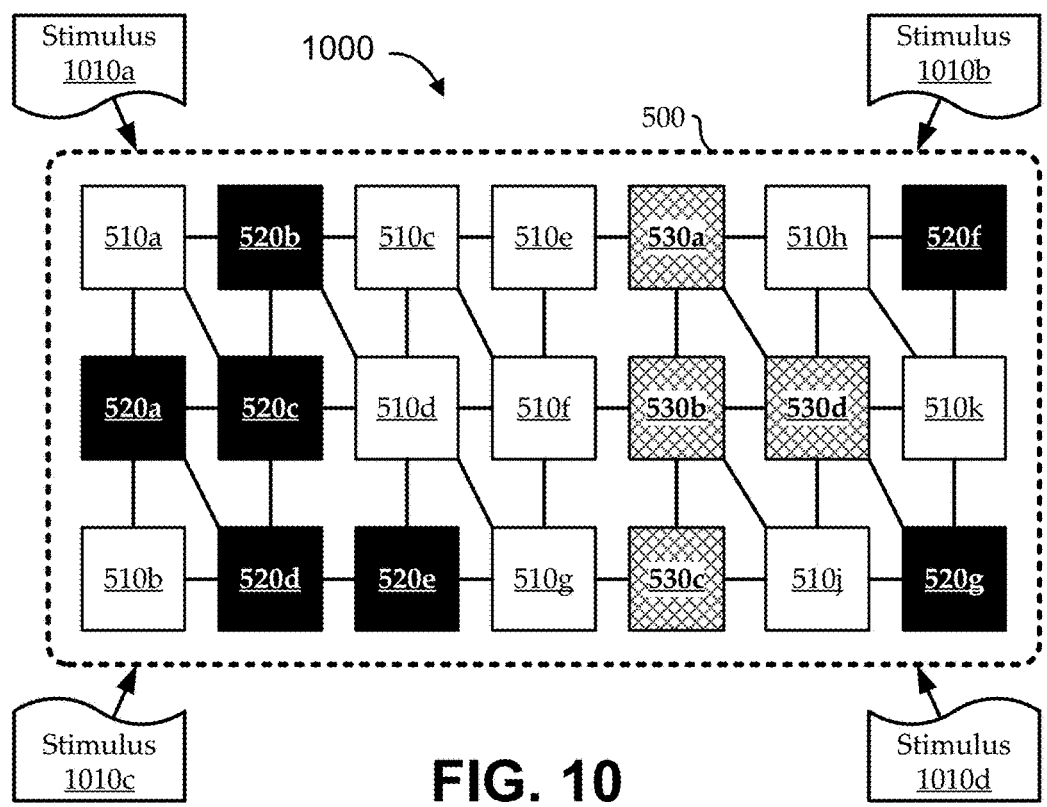
FIG. 10 shows an example diagram of a full connectivity graph with illustrative side node stimuli.

For the sake of illustration, FIG. 10 shows an example diagram 1000 of a full connectivity graph 415 with illustrative side node stimuli 1010. For example, use of the timing-sensitive full block netlist may involve propagating stimuli 1010 from primary inputs to intermediate nodes (e.g., through-nodes). Without first extracting the timing-sensitive path, it can be difficult to determine where to apply the stimuli 1010 (e.g., which is the appropriate through-node to stimulate with which input). Accordingly, as illustrated by FIG. 10, manual test bench generation (or otherwise generating the test bench data without first extracting the timing-sensitive path) can result in a broad description of primary inputs combining to form inputs to specific nodes.

Figure 11:
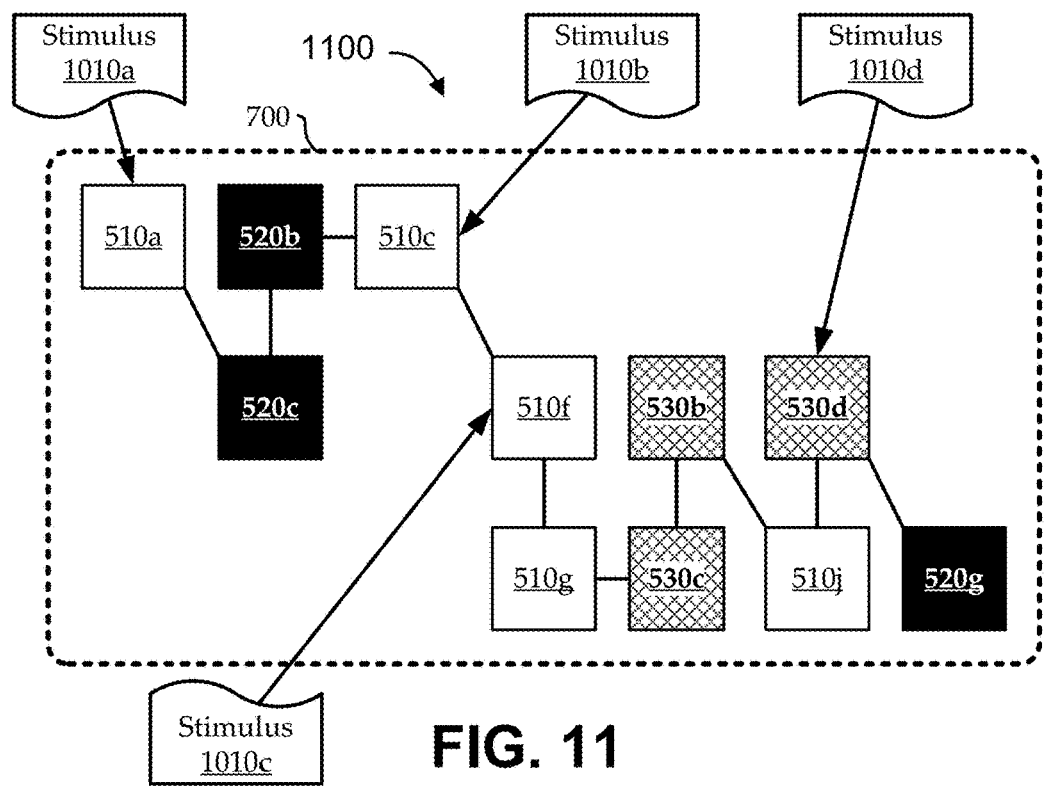
FIG. 11 shows an illustrative set of stimuli being applied to side node automatically identified from the timing-sensitive circuit.

Embodiments of the automatic test bench generator 440 can identify the proper through node associated with primary inputs and propagate the input signal to the same by using the extracted timing-sensitive circuit 435. For example, FIG. 11 shows an illustrative set of stimuli 1010 being applied to side node automatically identified from the timing-sensitive circuit 435. Rather than providing a general definition of primary inputs generally applied to the circuit, the automatic test bench generator 440 can automatically identify the appropriate side-input nodes and can automatically generate and apply the stimuli 1010 for those side-input nodes.

Some embodiments can further provide statistical simulations. In some implementations, the statistical simulations can be parallelized across multiple processors and/or threads. The simulations can be performed to quickly generate results, which can be post-processed to obtain timing margin distributions and/or to flag out design errors. For example, implementations can separate sampling and simulation steps to enable batch runs. For global variable simulations, embodiments can initialize parameters, generate samples, and simulate. For local variable simulations, embodiments can modify the netlist and add instant specific local variables, initialize parameters, generate samples, and simulate.

Figure 12:
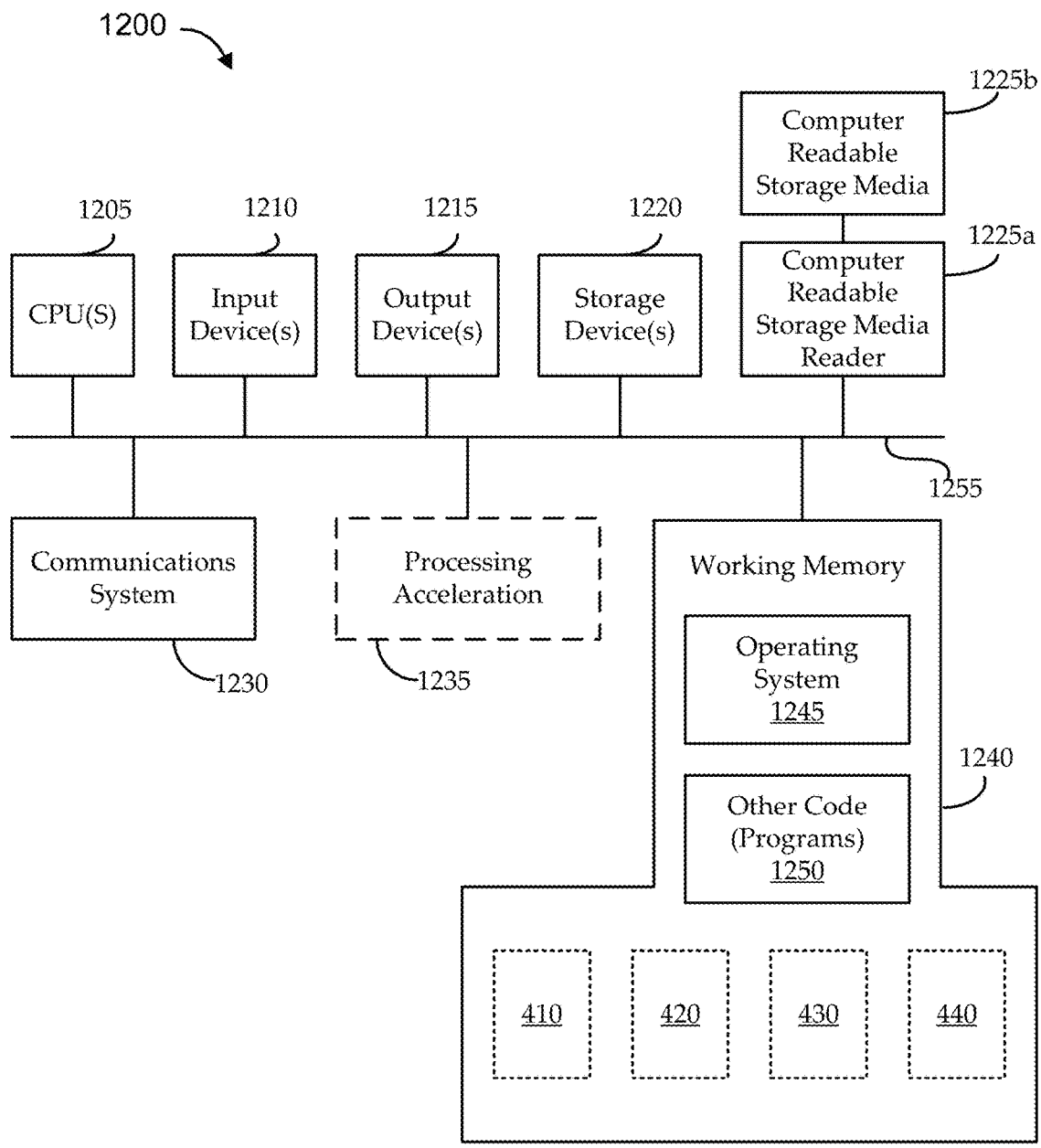
FIG. 12 shows an exemplary computational environment, in the context of which various embodiments may be implemented.

FIG. 12 shows an exemplary computational environment 1200, in the context of which various embodiments may be implemented. The computational environment 1200 may be implemented as or embodied in single or distributed computer systems, or in any other useful way. The computational environment 1200 is shown including hardware elements that may be electrically coupled via a bus 1255.

The hardware elements may include one or more central processing units (CPUs) 1205, one or more input devices 1210 (e.g., a mouse, a keyboard, etc.), and one or more output devices 1215 (e.g., a display device, a printer, etc.). The computational environment 1200 may also include one or more storage devices 1220. By way of example, storage device(s) 1220 may be disk drives, optical storage devices, solid-state storage device such as a random access memory (RAM) and/or a read-only memory (ROM), which can be programmable, flash-updateable and/or the like. The computational environment 1200 may additionally include a computer-readable storage media reader 1225a, a communications system 1230 (e.g., a modem, a network card (wireless or wired), an infrared communication device, etc.), and working memory 1240, which may include RAM and ROM devices as described above. In some embodiments, the computational environment 1200 may also include a processing acceleration unit 1235, which can include a DSP, a special-purpose processor, and/or the like. The computer-readable storage media reader 1225a can further be connected to a computer-readable storage medium 1225b, together (and, optionally, in combination with storage device(s) 1220) comprehensively representing remote, local, fixed, and/or removable storage devices plus storage media for temporarily and/or more permanently containing computer-readable information. The communications system 1230 may permit data to be exchanged with a network and/or any other computer described above with respect to the computational environment 1200.

The computational environment 1200 may also include software elements, shown as being currently located within a working memory 1240, including an operating system 1245 and/or other code 1250, such as an application program (which may be a client application, web browser, mid-tier application, RDBMS, etc.). For example, embodiments can be implemented as instructions, which, when executed by one or more processors 1205, cause the processors 1205 to perform certain functions. Such functions can include functionality of the connectivity graph generator 410, the trace constraints generator 420, the timing-sensitive circuit tracer 430, and/or the auto test bench generator 440 of FIG. 4, and/or any other suitable components of systems described herein.

Alternate embodiments of a computational environment 1200 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 1200 may include code 1250 for implementing embodiments of the present invention as described herein.

It will be appreciated that various systems, including the systems described above, can be used to implement embodiments of methods, for example, as described with reference to FIG. 13. However, where the methods are described in the context of specific system components, those descriptions are intended only for the sake of clarity and should not be construed as limiting the scope of method embodiments.

Figure 13:
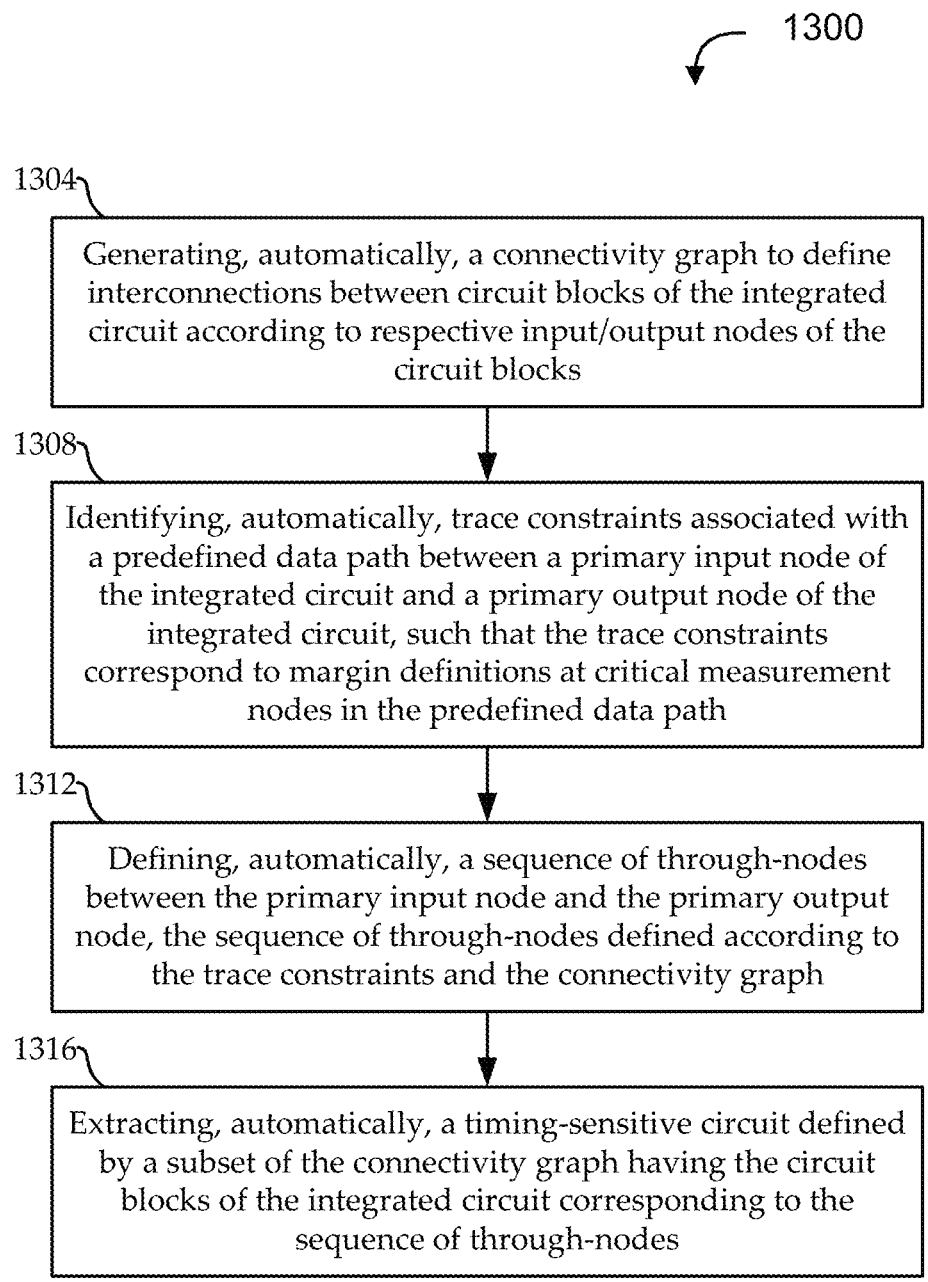
FIG. 13 shows a flow diagram of an illustrative method for automatically extracting a timing-sensitive circuit from an integrated circuit, according to various embodiments.

FIG. 13 shows a flow diagram of an illustrative method 1300 for automatically extracting a timing-sensitive circuit for statistical timing margin simulations from an integrated circuit, according to various embodiments. Some embodiments of the method 1300 begin at stage 1304 by generating, automatically, a connectivity graph to define interconnections between circuit blocks of the integrated circuit according to respective input/output nodes of the circuit blocks. In some implementations, the generating includes partitioning a netlist of the integrated circuit according to a pre-defined architecture model to define the plurality of circuit blocks. The generating can also (or alternatively) include pattern matching the netlist of the integrated circuit to define a first portion of the circuit blocks automatically as grey-box components and to define a second portion of the circuit blocks automatically as black-box components. For example, the grey-box components can include latches, flops, and/or other suitable components; and the black-box components can include sense amplifier cells, array bit cells, and/or other suitable components. In some such implementations, each grey-box component can be defined according to a respective full table file, and each black-box component can be defined according to a respective dummy table file. In some cases, a side input sensitization can be generated for each grey-box component according to its respective full table file. In some implementations, the generating can include defining a portion of the circuit blocks automatically according to their combinatorial logic by channel-connected region partitioning a netlist of the integrated circuit. For example, such circuit blocks can include decoders and/or other suitable components.

At stage 1308, embodiments can identify, automatically, trace constraints associated with a predefined data path between a primary input node of the integrated circuit and a primary output node of the integrated circuit, such that the trace constraints correspond to margin definitions at critical measurement nodes in the predefined data path. In some implementations, multiple data paths can be identified between the primary input node of the integrated circuit and a primary output node of the integrated circuit. For example, the multiple data paths can include a timing-sensitive read path and a timing-sensitive write path (e.g., a read control and data path, a write control path, and a write data path).

At stage 1312, embodiments can define, automatically, a sequence of through-nodes between the primary input node and the primary output node. The sequence of through-nodes can be defined according to the trace constraints and the connectivity graph. In some implementations, defining the sequence of through-nodes between the primary input node and the primary output node can include executing a forward topological search from the primary input node to define a first through-node in the sequence and executing a backward topological search from the primary output node to define a last through-node in the sequence.

At stage 1316, embodiments can extract, automatically, a timing-sensitive circuit defined by a subset of the connectivity graph having the circuit blocks of the integrated circuit corresponding to the sequence of through-nodes. As described above, the timing-sensitive circuit can be used to facilitate a number of features. In some embodiments, the timing-sensitive circuit can be used to automatically generate circuit test bench data, such as a set of side nodes and side-node stimuli for use with a test bench. The test bench data can be used, for example, to execute Monte Carlo simulations of the circuit with appropriate process corner definition.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, or actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for automatically extracting a timing-sensitive circuit from an integrated circuit, the system comprising:
   a non-transient circuit data store having, stored thereon, a netlist defining circuit blocks of an integrated circuit and a measurement node list defining a plurality of measurement nodes and respective margin definitions;
   a connectivity graph generator having:
      a netlist input coupled with the circuit data store; and
      a connectivity graph output comprising a connectivity graph generated by the connectivity graph generator to define interconnections between the plurality of circuit blocks of the integrated circuit according to the netlist input;
   a trace constraints generator having:
      a measurement node input coupled with the circuit data store; and
      a trace constraints output comprising a plurality of trace constraints identified by the trace constraints generator, according to the measurement node input, as associated with a predefined data path between a primary input node of the integrated circuit and a primary output node of the integrated circuit, such that the trace constraints correspond to the respective margin definitions at a plurality of the measurement nodes in the predefined data path; and
   a timing-sensitive circuit tracer having:
      a connectivity graph input coupled with the connectivity graph output;
      a trace constraints input coupled with the trace constraints output; and
      a timing-sensitive circuit output comprising a timing-sensitive circuit defined by a subset of the connectivity graph having the circuit blocks of the integrated circuit corresponding to a sequence of through-nodes defined between the primary input node and the primary output node according to the trace constraints input and the connectivity graph input.

2. The system of claim 1, wherein the connectivity graph is generated by partitioning a netlist of the integrated circuit according to a pre-defined architecture model to define the plurality of circuit blocks.

3. The system of claim 1, wherein the connectivity graph is generated by pattern matching the netlist of the integrated circuit to define a first portion of the plurality of circuit blocks as grey-box components and to define a second portion of the plurality of circuit blocks as black-box components.

4. The system of claim 3, wherein:
   the non-transient circuit data store further has stored thereon a plurality of full table files and a plurality of dummy table files;
   each of the plurality of grey-box components is defined according to a respective one of the full table files; and
   each of the plurality of black-box components is defined according to a respective one of the dummy table files.

5. The system of claim 4, wherein the connectivity graph is further generated by generating a side input sensitization for each of the plurality of grey-box components according to its respective full table file.

6. The system of claim 5, further comprising:
an automatic test bench generator having:
- a timing-sensitive circuit input coupled with the timing-sensitive circuit tracer output; and
- a test-bench output comprising a subset of the plurality of circuit blocks identified as side-input nodes and a plurality of stimuli for application to the side-input nodes, at least some of the stimuli generated according to the side input sensitizations.

7. The system of claim 1, wherein the connectivity graph is generated by defining a portion of the plurality of circuit blocks automatically according to combinatorial logic of the circuit blocks by channel-connected region partitioning a netlist of the integrated circuit.

8. The system of claim 1, wherein the plurality of trace constraints is identified by identifying a plurality of data paths between the primary input node of the integrated circuit and a primary output node of the integrated circuit, the plurality of data paths comprising a timing-sensitive read path and a timing-sensitive write path.

9. The system of claim 1, wherein the sequence of through-nodes between the primary input node and the primary output node is further defined by executing a forward topological search from the primary input node to define a first through-node in the sequence and executing a backward topological search from the primary output node to define a last through-node in the sequence.

10. The system of claim 1, further comprising:
a processor; and
a non-transient data store having instructions stored thereon, which, when executed, cause the processor to implement the connectivity graph generator, the trace constraints generator, and the timing-sensitive circuit extractor.

11. A method for extracting a timing-sensitive circuit from an integrated circuit, the method comprising:
with a connectivity graph generator, generating a connectivity graph to define interconnections between a plurality of circuit blocks of the integrated circuit according to respective input/output nodes of the circuit blocks;
with a trace constraints generator, identifying a plurality of trace constraints associated with a predefined data path between a primary input node of the integrated circuit and a primary output node of the integrated circuit, such that the trace constraints correspond to a plurality of margin definitions at a plurality of critical measurement nodes in the predefined data path;
with a timing-sensitive circuit tracer, defining a sequence of through-nodes between the primary input node and the primary output node, the sequence of through-nodes defined according to the trace constraints and the connectivity graph; and
with the timing-sensitive circuit tracer, extracting a timing-sensitive circuit defined by a subset of the connectivity graph having the circuit blocks of the integrated circuit corresponding to the sequence of through-nodes.

12. The method of claim 11, wherein the generating comprises partitioning a netlist of the integrated circuit according to a pre-defined architecture model to define the plurality of circuit blocks.

13. The method of claim 11, wherein the generating comprises pattern matching the netlist of the integrated circuit to define a first portion of the plurality of circuit blocks as grey-box components and to define a second portion of the plurality of circuit blocks as black-box components.

14. The method of claim 13, wherein each of the plurality of grey-box components is defined according to a respective full table file, and each of the plurality of black-box components is defined according to a respective dummy table file.

15. The method of claim 14, wherein the generating further comprises generating a side input sensitization for each of the plurality of grey-box components according to its respective full table file.

16. The method of claim 13, wherein the plurality of grey-box components comprises a latch and/or a flop, and the plurality of black-box components comprises a sense amplifier cell and/or an array bit cell.

17. The method of claim 11, wherein the generating comprises defining a portion of the plurality of circuit blocks according to combinatorial logic of the circuit blocks by channel-connected region partitioning a netlist of the integrated circuit.

18. The method of claim 17, wherein the portion of the plurality of circuit blocks comprises a decoder.

19. The method of claim 11, wherein the identifying comprises identifying a plurality of data paths between the primary input node of the integrated circuit and a primary output node of the integrated circuit, the plurality of data paths comprising a timing-sensitive read path and a timing-sensitive write path.

20. The method of claim 11, wherein defining the sequence of through-nodes between the primary input node and the primary output node further comprises executing a forward topological search from the primary input node to define a first through-node in the sequence and executing a backward topological search from the primary output node to define a last through-node in the sequence.

* * * * *